United States Patent [19]

Lin

[11] Patent Number: 5,580,182
[45] Date of Patent: Dec. 3, 1996

[54] COMPUTER PERIPHERAL ENGAGEMENT/DISENGAGEMENT MECHANISM

[75] Inventor: Tien-Chang Lin, Taipei, Taiwan

[73] Assignee: Inventec Corporation, Taipei, Taiwan

[21] Appl. No.: 467,432

[22] Filed: Jun. 7, 1995

[51] Int. Cl.⁶ .................. G06F 1/00; H01R 13/62
[52] U.S. Cl. .......... 403/325; 403/321; 361/686; 292/228; 439/352
[58] Field of Search ................ 403/321, 322, 403/325; 361/686, 685, 684, 681; 292/11, 19, 128, 228; 439/352, 353, 357

[56] References Cited

U.S. PATENT DOCUMENTS

| | | | |
|---|---|---|---|
| 4,893,263 | 1/1990 | Myers | 439/352 X |
| 4,901,261 | 2/1990 | Fuhs | 361/685 X |
| 4,940,414 | 7/1990 | Lee | 439/352 X |
| 5,465,191 | 11/1995 | Nomura et al. | 361/732 X |
| 5,472,351 | 12/1995 | Greco et al. | 439/353 |

*Primary Examiner*—Anthony Knight
*Attorney, Agent, or Firm*—Lowe, Price, LeBlanc & Becker

[57] ABSTRACT

Disclosed is an engagement/disengagement mechanism provided on a peripheral allowing the peripheral to be engaged with and disengaged from a notebook computer effortlessly without the need of extra tools. To attach the peripheral to the back of the notebook computer, the user needs just to align the connector and hooks on the peripheral with the counterpart connector and opening on the back of the notebook computer, and then push forcibly the peripheral against the back of the notebook computer. To detach the peripheral from the notebook computer, the user needs just to push the presser down and then pull the peripheral backwards to make the detachment. It is this simple to make the engagement and disengagement between the peripheral and the notebook computer.

6 Claims, 5 Drawing Sheets

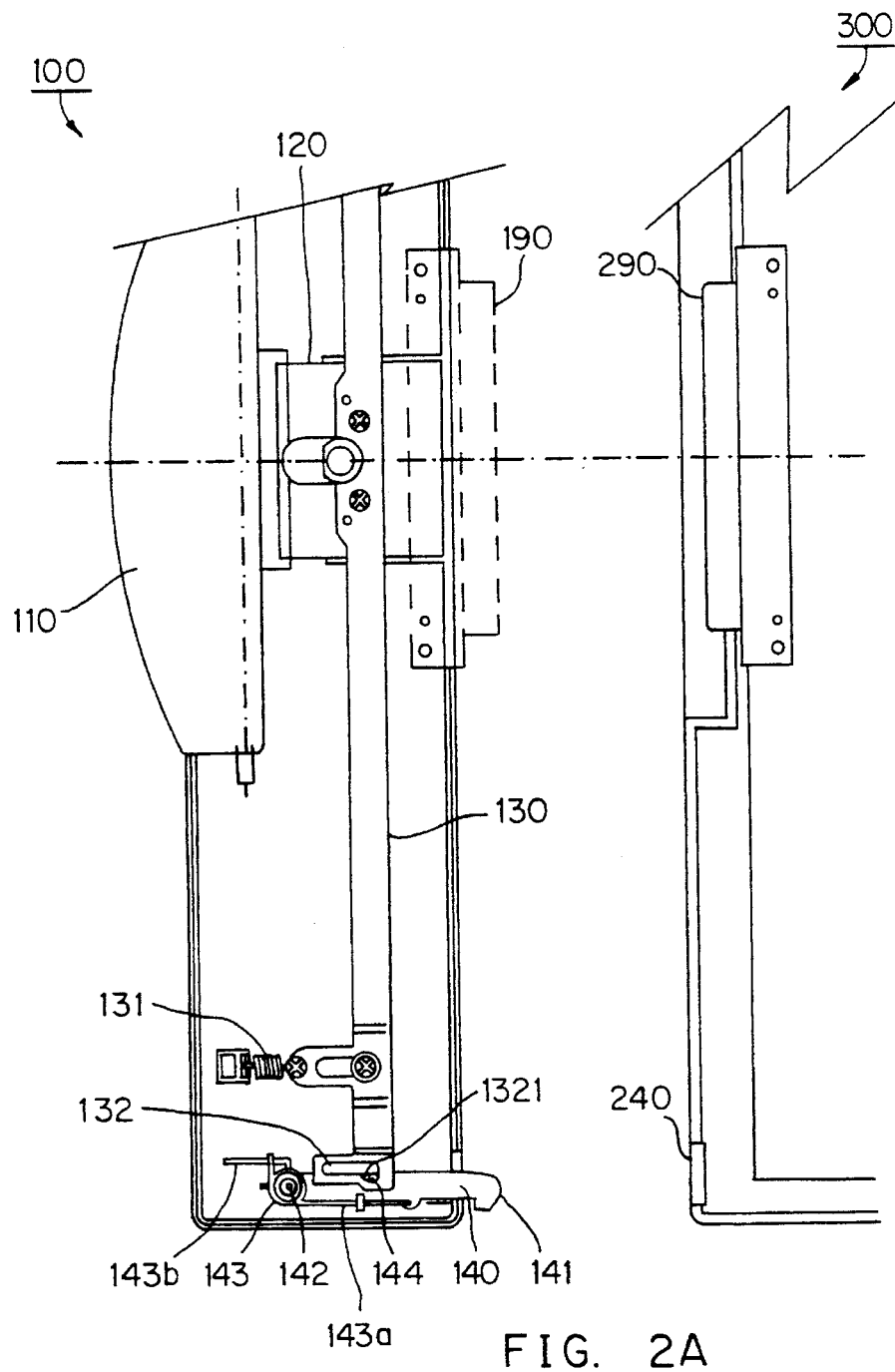
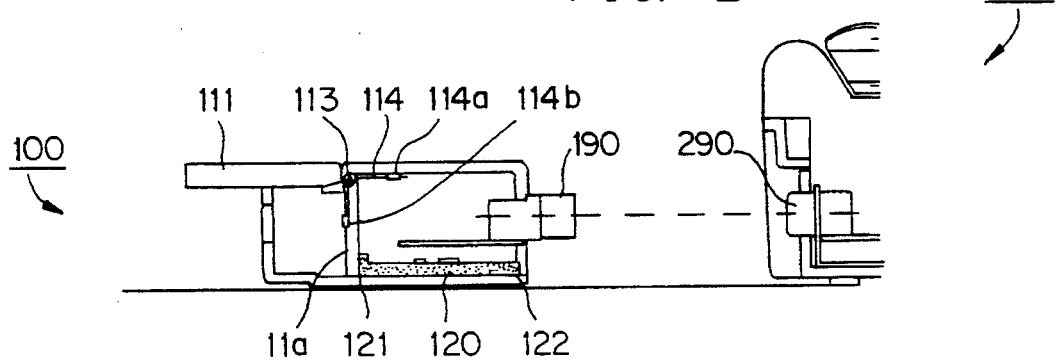
FIG. 2A
FIG. 2B

COMPUTER PERIPHERAL ENGAGEMENT/DISENGAGEMENT MECHANISM

BACKGROUND OF THE INVENTION

1. Field of the Invention

The present invention relates to computers, and more particularly, to a notebook computer peripheral engagement/disengagement mechanism.

2. Description of Prior Art

Notebook computers usually come with an optional peripheral engaged to the back. The peripheral communicates with the notebook computer via a multiple-pin connector and can be securely engaged with the notebook computer by means of screws or hooks.

A drawback of using screws or hooks for the engagement is that it usually requires a lot of labor and time when detaching the peripheral from the notebook computer. Besides, the disengagement usually needs such tools as screw drivers to complete, thus adding extra load to the user who carries the notebook computer on the go. Using hooks for the engagement may not require extra tools to make the disengagement; however, extra effort is usually needed to release the hooks from engagement.

There exists, therefore, a need for an engagement/disengagement mechanism for the peripheral that allows the notebook computer user to engage/disengage the peripheral without the need of extra tools and effort.

SUMMARY OF THE INVENTION

It is therefore a primary objective of the present invention to provide a notebook computer peripheral engagement/disengagement mechanism that allows the notebook computer user to engage/disengage the peripheral without the need of extra tools.

It is another objective of the present invention to provide a notebook computer peripheral engagement/disengagement mechanism that allows the notebook computer user to engage/disengage the peripheral easily and effortlessly.

In accordance with the foregoing and other objectives of the present invention, a novel engagement/disengagement mechanism for engaging a peripheral with a notebook is provided. The engagement/disengagement mechanism includes a presser substantially L-shaped in cross section, having a pressing part for the user to press thereon and an exerting part. The presser further includes elastic means embodied as a spiral spring having two elongated ends oriented in right angle with each other for restoring the presser to its original position after the presser is pressed down. A pushing member having one end coupled to the exerting part of the presser is provided in such a way that when the presser is at down position the pushing member is shifted in position to cause the other end of the pushing member to be protruded to the outside of the peripheral. A pair of hooks are elastically pivoted at opposite sides of the peripheral, used for hook-up engagement with the notebook computer. The engagement/disengagement mechanism further includes disengagement actuating means, embodied as a substantially L-shaped slot provided on a linking bar fixed on the pushing member and a protrusion provided on the hook, for pivotally moving the hook so as to release the engagement of the hook with the notebook computer.

To attach the peripheral to the back of the notebook computer, the user needs just to align the connector and hooks on the peripheral with the counterpart connector and opening on the back of the notebook computer, and then push forcibly the peripheral against the back of the notebook computer. To detach the peripheral from the notebook computer, the user needs just to push the presser down and then pull the peripheral backwards to make the detachment. It is this simple to make the engagement and disengagement between the peripheral and the notebook computer.

BRIEF DESCRIPTION OF DRAWINGS

The present invention can be more fully understood by reading the subsequent detailed description of the preferred embodiments thereof with references made to the accompanying drawings, wherein:

FIGS. 2A–2B are respectively a top view and a side view, showing when the peripheral is separated from the notebook computer;

DETAILED DESCRIPTION OF PREFERRED EMBODIMENT

Figure 1:
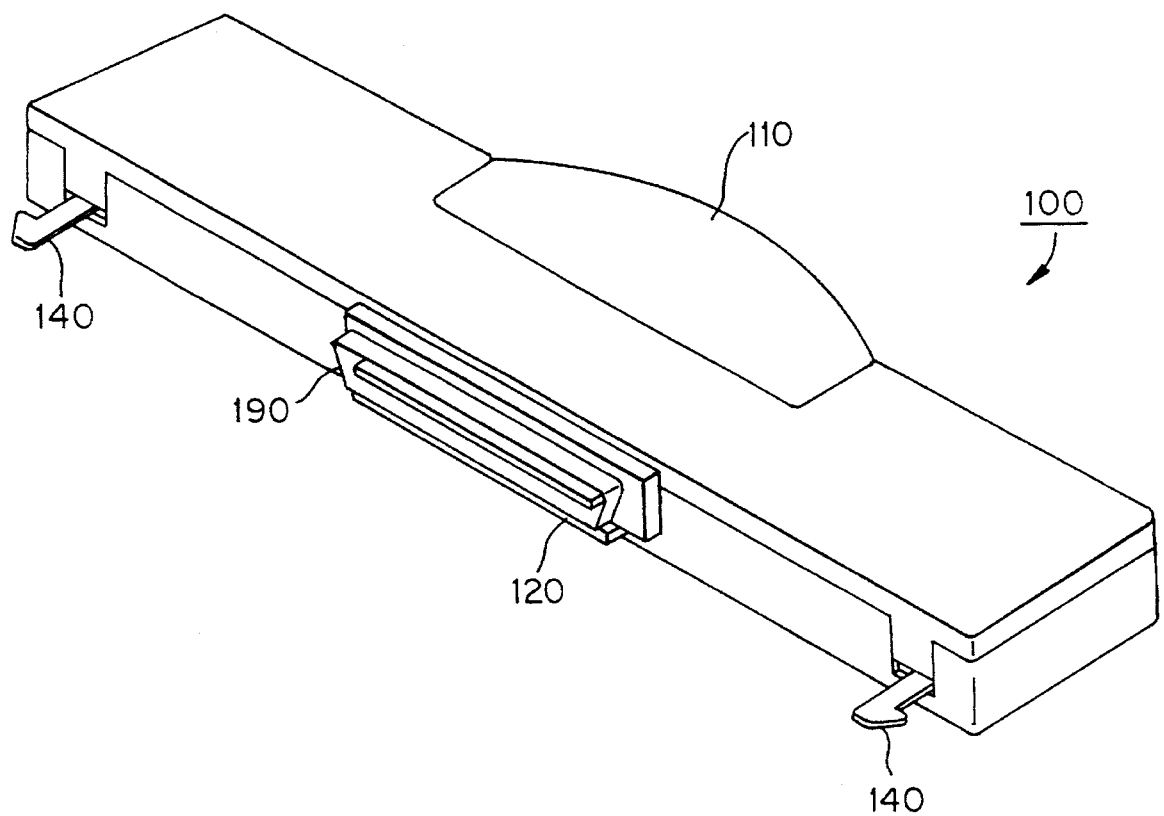
FIG. 1 shows a perspective view of a notebook computer peripheral provided with an engagement/disengagement mechanism according to the present invention.

FIG. 1 shows the outer appearance of a notebook computer peripheral 100 provided with the engagement/disengagement mechanism according to the present invention. Here in this example the peripheral 100 is a circuit splitter that divides the data communication path from a connector 290 of the notebook computer 200 (see FIG. 2A) into two paths so that the notebook computer 200 can be linked to two other devices. It is to be understood, however, that the engagement/disengagement mechanism according to the present invention can be provided on any types of peripherals of the notebook computer, such as CD-ROM drives, external disk drives, pointing devices, and so on, that are coupled to the notebook computer by means of connectors. Broadly speaking, the engagement/disengagement mechanism can be provided on a first device having a first connector for engaging the first device with a second device having a second connector coupled with the first connector on the first device.

As shown in FIG. 1, the peripheral 100 is provided also with a multiple-pin connector 190 which is to be connected to the connector 290 on the notebook computer 200 for data communication between the two. A pair of hooks 140 are provided at opposite sides of the peripheral 100, which are used for hook-up engagement with the notebook computer 200. The engagement can be made simply by aligning the two hooks respectively with each of the two openings 240 on the notebook computer 200, and then pushing forcibly the peripheral 100 against the back of the notebook computer 200. This also couples the connector 190 with its counterpart connector 290 on the notebook computer 200. To separate the peripheral 100 from the notebook computer 200, the user needs just to press down a presser 110 with slight effort. This single action causes the hooks 140 along with the connector 190 to be separated from the notebook computer 200.

Referring to FIGS. 2A–2B, the engagement/disengagement mechanism according to the present invention is composed of a presser 110, a pushing member 120, a linking bar 130, and a pair of hooks 140. Note that since the assembly of the preferred embodiment is in symmetry about the presser 100, here and hereinafter in the drawings FIG. 2A, FIG. 3A, FIG. 4A and FIG. 5A, only one side is illustrated.

As shown in FIG. 2B, the presser 110 is L-shaped in its cross section, including a pressing part 111 for the user to press thereon and an urging part 112 having its end in contact with the left end 121 of the pushing member 120. The presser 110 is pivoted at the bent 113 of the L-shaped structure such that when the user pushes down the pressing part 111, the urging part 112 is pivoted to the right (see FIG. 4B and FIG. 5B), thereby urging the pushing member 120 to move to the right. A spiral spring 114 is provided to restore the presser 110 to the original position after being pushed down. The spiral spring 114 has two elongated ends 114a, 114b, oriented in right angle with respective to each other with one end 114a fixed to the casing of the peripheral and the other end 114b fixed to the exerting part 112 of the presser 110. When the presser 110 is pushed down to pivot the exerting part 112 to the right, the elongated end 114b of the spring 114 is also brought to the right. Therefore, when the user removes his/her hand from the presser 110, the presser 110 can be restored to the original position due to the elastic property of the spring 114.

As shown in FIG. 2A, the linking bar 130 is a horizontal bar fixed by screws on top of the pushing member 120. When the pushing member 120 is urged by the presser 110 to move to the right, the linking bar 130 is also moved to the right. A spring 131 is used to help pulling the linking bar 130 back to its original position after the user remove his/her hand from the presser 110.

The hook 140 has a bent portion 141 and a pivoted end 142. A spiral spring 143 having two elongated ends 143a and 143b is mounted at the pivoted end 142 of the hook 140. The two elongated ends 143a, 143b are oriented in parallel with each other, with the end 143a fixed to the length of the hook 140 and the other end 143b fixed to the casing of the peripheral 100. The hook 140 is coupled to the linking bar 130 by means of a protrusion 144 provided thereon and a slot 132 provided at the end of the linking bar 130. The slot 132 is substantially L-shaped with an oblique portion 1321. Due to oblique portion 1321, the protrusion 144 on the hook 140 can be forced to travel along the L-shaped path in the slot 132 when the linking bar 130 is urged to move to the right and thereby pulls the hook 140 inwards. The slot 132 and the protrusion 144 in cooperation act as disengagement actuating means for the hook 140, which will be described later.

Engaging the Peripheral

To attach the peripheral 100 to the back of the notebook computer 200, the user needs just to align the connector 190 and hooks 140 on the peripheral 100 with the counterpart connector 290 and opening 240 on the back of the notebook computer 200, and then push forcibly the peripheral 100 against the back of the notebook computer 200. It is this simple to make the engagement of the peripheral 100 with the notebook computer 200.

Figure 3A:
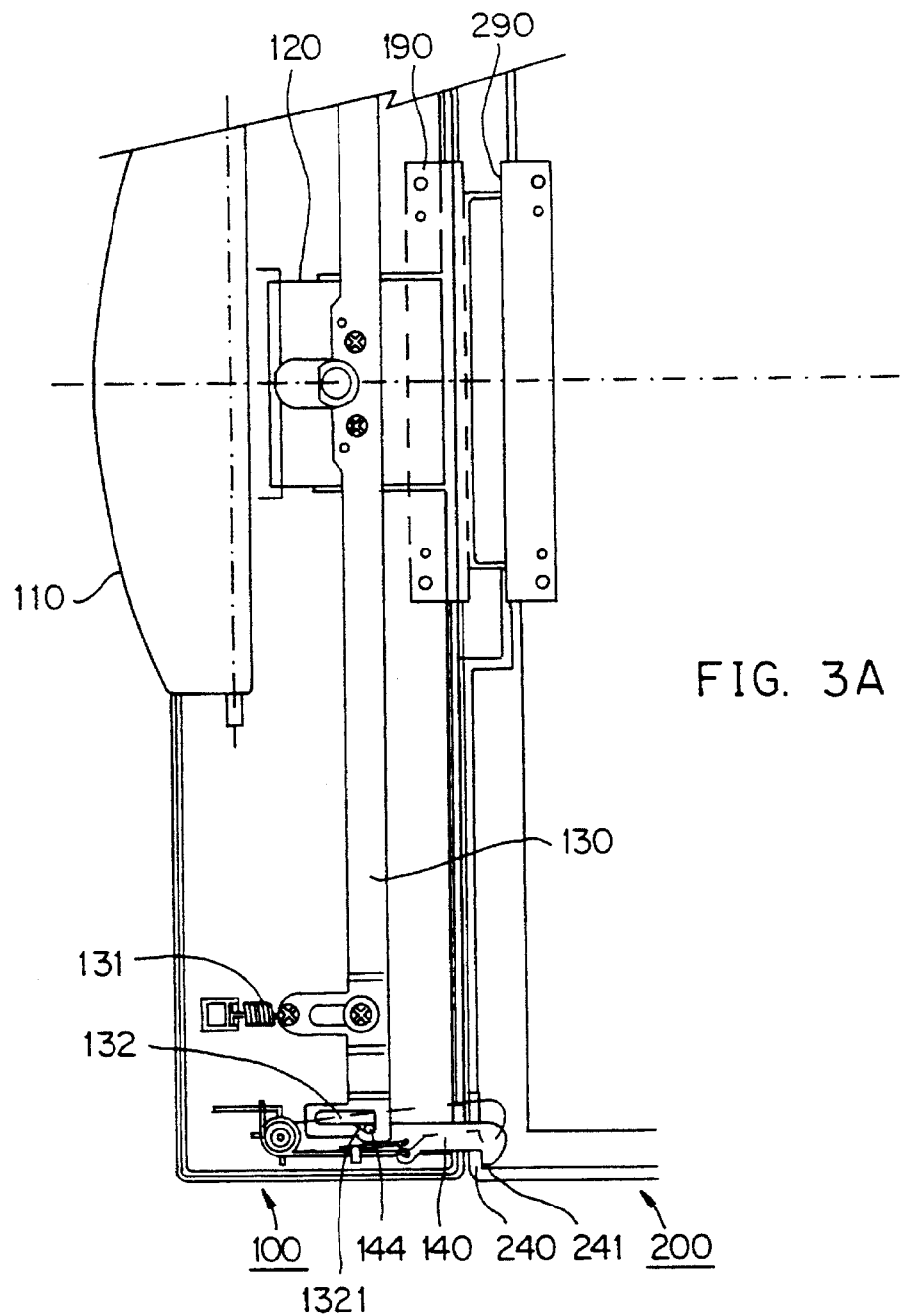
FIGS. 3A–3B are respectively a top view and a side view, showing how the peripheral provided with the engagement/disengagement mechanism according to the present invention is engaged with the notebook computer.
Figure 3B:
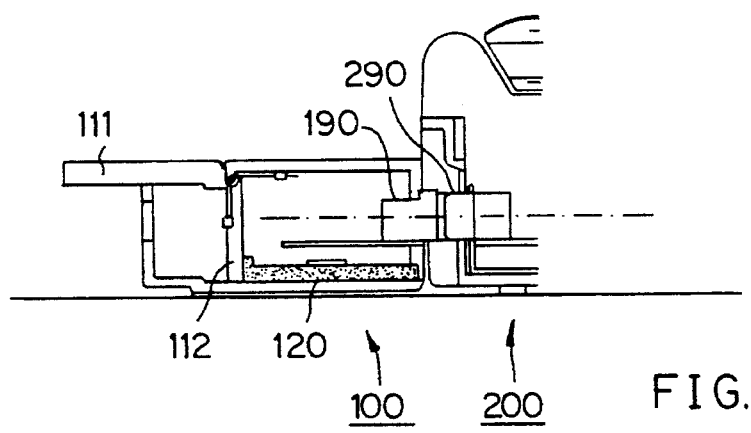

Referring to FIGS. 3A–3B, during the insertion of the hook 140 into the opening 240, since the hook 140 is shaped with the head of its bent portion 141 slightly angled, the bent portion 141 of the hook 140 is urged by the edge of the opening 240 slightly inward, as illustrated in dotted line in FIG. 3A. Upon completely entering into the opening 240, the bent portion 141 of the hook 140 moves back due to the elasticity of the spring 145 so as to be hooked up with the edge 241 of opening 240.

Disengaging the Peripheral

Figure 4A:
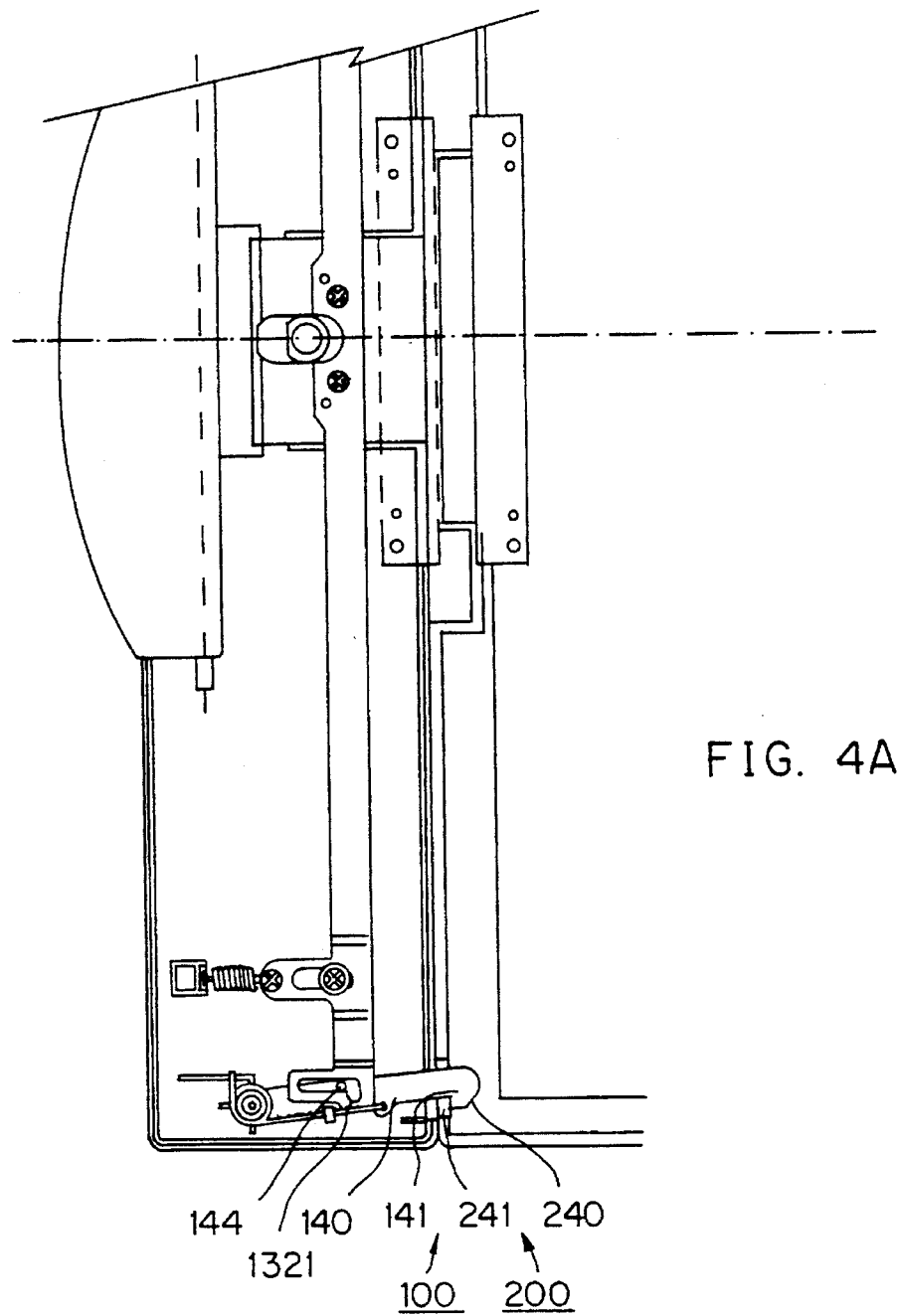
FIGS. 4A–4B are respectively a top view and a side view, showing a first stage in which the peripheral provided with the engagement/disengagement mechanism according to the present invention is disengaged from the notebook computer.
Figure 4B:
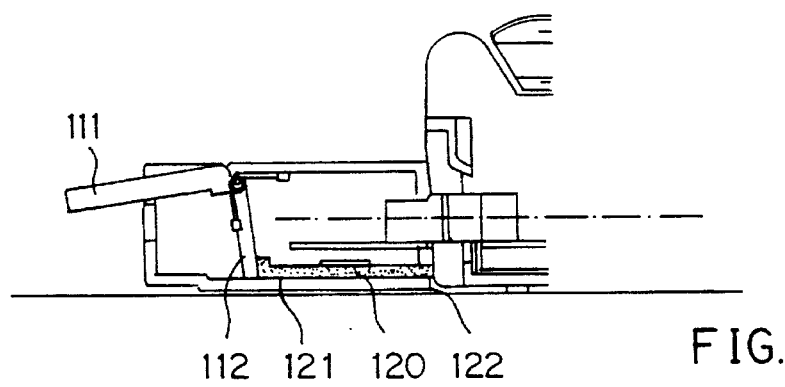
Figure 5A:
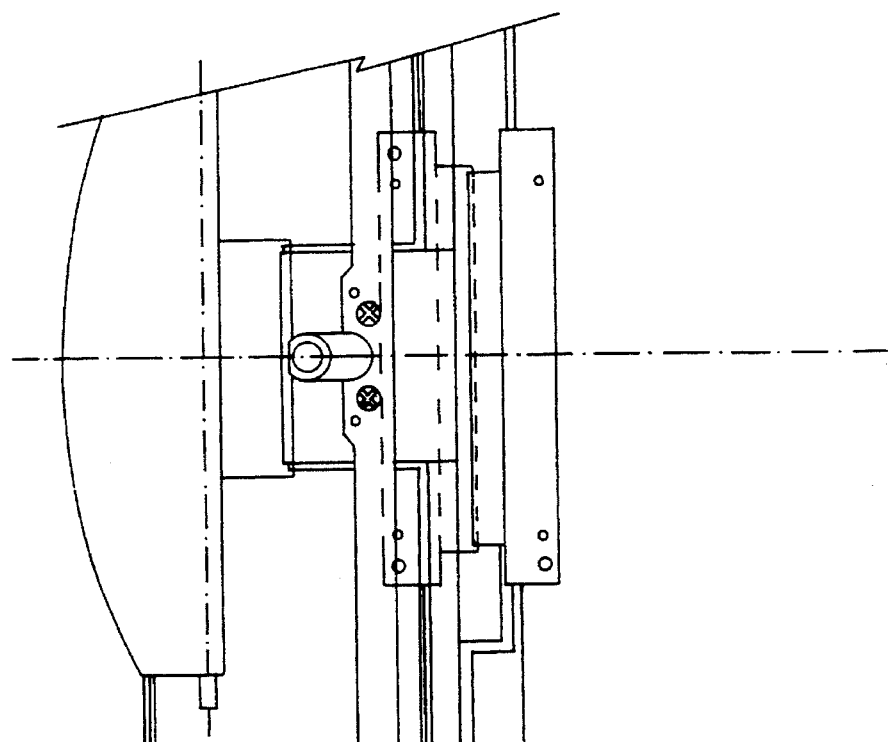
FIGS. 5A–5B are respectively a top view and a side view, showing a second stage in which the peripheral provided with the engagement/disengagement mechanism according to the present invention is disengaged from the notebook computer
Figure 5A:
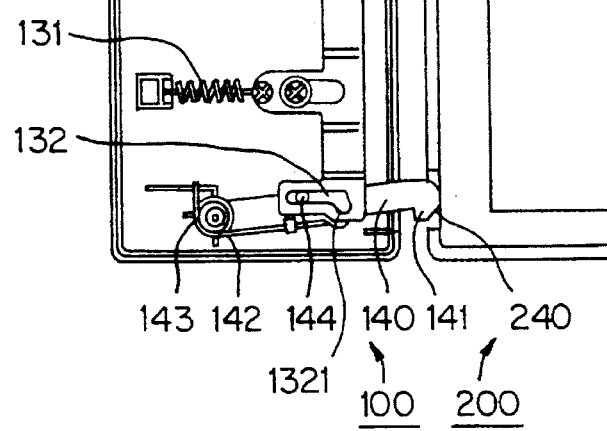

To detach the peripheral 100 from the notebook computer 200, the user needs just to push the presser 110 down and then pull the peripheral 100 backwards to make the detachment. Referring to FIGS. 4A–4B, when the presser 110 is at the down position, the linking bar 130 is moved to the right, thereby causing the slot 132 to pull the hook 140 inward. The bent portion 141 of the hook 140 is therefore moved away from the hook-up position with the edge 241 of the opening 240. This allows the bent portion 141 of the hook 140 to be withdrawn out of the opening 240 without being obstructed by the edge 241 of the opening 240 as shown in FIG. 5A.

Figure 5B:
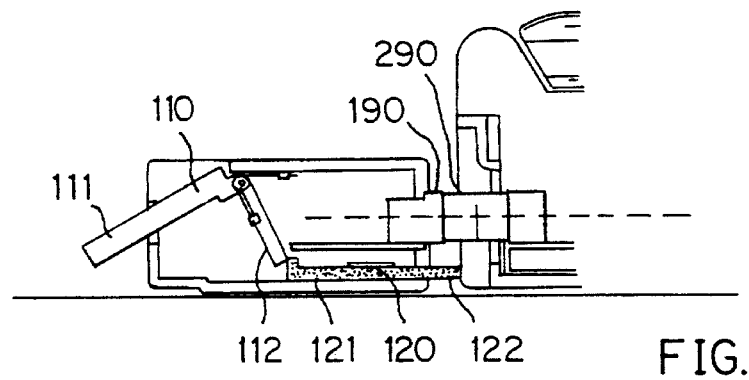

In addition, the presser 110, when pushed down at the down position, also causes the pushing member 120 to be moved to the right, allowing its right end 122 to be protruded to the outside of the peripheral 100 and urge against the casing of the notebook computer 200 as shown in FIG. 5B. Since the pushing member 120 is an arranged right beneath the connector 190, the urging of the pushing member 120 helps to disengage the two connectors 190, 290. With this provision, the peripheral 100 can be detached from the notebook computer 200 much more easily and effortlessly.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. An engagement/disengagement mechanism provided on a first device having a first connector for engaging the first device with a second device having a second connector coupled with the first connector on the first device, comprising:

(a) a presser substantially L-shaped in cross section, having a pressing part for the user to press thereon and an exerting part, said presser further including elastic means allowing said presser to restore to the original position after being pressed down;

(b) a pushing member provided near the first connector and having one end coupled to the exerting part of said presser such that when said presser is at down position said pushing member is shifted in position to cause the other end of said pushing member to protrude to the outside of the first device and thereby push against the second device to help separating the first conenctor from the second connector;

(c) at least a hook elastically pivoted for engagement with the second device;

(d) disengagement actuating means, coupled between said pushing member and said hook, for pivotally moving said hook so as to release the engagement of the hook with the second device; and (e) a linking bar fixed on said pushing member, said disengagement actuating means comprising a substantially L-shaped slot provided on said linking bar and a protrusion provided on said hook.

2. An engagement/disengagement mechanism as claimed in claim 1, wherein said substantially L-shaped slot has an oblique portion allowing said protrusion to travel along said substantially L-shaped slot so as to pull said hook inward.

3. An engagement/disengagement mechanism as claimed in claim 1, wherein said presser is coupled with a spiral spring for restoring said presser to its original position after said presser being pressed down.

4. An engagement/disengagement mechanism as claimed in claim 1, wherein said linking bar is coupled with a spiral spring for restoring said linking bar to its original position after being shifted in position by the pressing down of said presser.

5. An engagement/disengagement mechanism as claimed in claim 1, wherein said hook is coupled with a spiral spring for restoring said hook to its original position after being pivoted to one side.

6. An engagement/disengagement mechanism as claimed in claim 1, wherein said pushing member is provided beneath the first connector.

* * * * *